(12) United States Patent
Bohl et al.

(10) Patent No.: US 12,008,057 B2
(45) Date of Patent: Jun. 11, 2024

(54) DETERMINING A VISUAL THEME IN A COLLECTION OF MEDIA ITEMS

(71) Applicant: Google LLC, Mountain View, CA (US)

(72) Inventors: Kristina Bohl, Boulder, CO (US); Ivan Oropeza, Santa Clara, CA (US); Lily Berg, Los Angeles, CA (US); Tracy Gu, Mountain View, CA (US); Ethan Schreiber, New York City, NY (US); Shanfeng Zhang, Mountain View, CA (US); Howard Zhou, Mountain View, CA (US); David Hendon, San Francisco, CA (US); Zhen Li, Mountain View, CA (US); Futang Peng, Mountain View, CA (US); Teresa Ko, Los Angeles, CA (US); Jason Chang, Cupertino, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/509,767

(22) Filed: Oct. 25, 2021

(65) Prior Publication Data

US 2022/0365990 A1    Nov. 17, 2022

Related U.S. Application Data

(60) Provisional application No. 63/189,658, filed on May 17, 2021, provisional application No. 63/187,390, filed on May 11, 2021.

(51) Int. Cl.
*G06F 16/9535*    (2019.01)
*G06F 16/906*    (2019.01)
(Continued)

(52) U.S. Cl.
CPC ........ *G06F 16/9535* (2019.01); *G06F 16/906* (2019.01); *G06F 16/9538* (2019.01); *G06F 40/30* (2020.01); *G06N 20/00* (2019.01)

(58) Field of Classification Search
CPC ............... G06F 16/9535; G06F 16/906; G06F 16/9538; G06F 40/30; G06F 16/55; G06N 20/00; G06V 10/7635
(Continued)

(56) References Cited

U.S. PATENT DOCUMENTS 9,460,123 B1 * 10/2016 Strutt .................. G06F 16/5838
9,471,671 B1 * 10/2016 Juang .................... G06F 16/435
(Continued)

FOREIGN PATENT DOCUMENTS

JP          6889304 B1 *   6/2021
KR      20120025240 A *   5/2012

OTHER PUBLICATIONS

EPO, International Search Report for International Patent Application No. PCT/US2021/063116, dated Mar. 31, 2022, 3 pages.
(Continued)

*Primary Examiner* — Grace Park
*Assistant Examiner* — Abdullah A Daud
(74) *Attorney, Agent, or Firm* — IP Spring

(57) ABSTRACT

A media application determines, based on pixels of images or videos from a collection of media items, clusters of media items such that the media items in each cluster have a visual similarity, wherein the collection of media items is associated with a user account. The media application selects a subset of the clusters of media from corresponding clusters of media items based on the media items in each cluster having a visual similarity within a range of threshold simi-
(Continued)

larity values. The media application causes a user interface to be displayed that includes the subset of the clusters of media.

20 Claims, 8 Drawing Sheets

(51) Int. Cl.
  *G06F 16/9538* (2019.01)
  *G06F 40/30* (2020.01)
  *G06N 20/00* (2019.01)
(58) Field of Classification Search
  USPC .......................................................... 707/723
  See application file for complete search history.

(56) References Cited

U.S. PATENT DOCUMENTS

| | | | | |
|---|---|---|---|---|
| 11,087,880 | B1* | 8/2021 | Shah | G16H 40/20 |
| 11,157,930 | B1* | 10/2021 | Bachu | G06Q 30/0201 |
| 2012/0131028 | A1* | 5/2012 | Glachant | H04W 4/02 |
| | | | | 707/E17.014 |
| 2014/0289658 | A1* | 9/2014 | Gelernter | G06F 9/451 |
| | | | | 715/765 |
| 2016/0042253 | A1 | 2/2016 | Sawhney | |
| 2016/0313876 | A1* | 10/2016 | Dong | G06T 11/206 |
| 2017/0110154 | A1* | 4/2017 | Dai | H04N 5/7605 |
| 2018/0365244 | A1* | 12/2018 | Talekar | G06F 16/68 |
| 2019/0171753 | A1* | 6/2019 | Teng | G06F 16/285 |
| 2019/0266185 | A1* | 8/2019 | Rao | H04N 21/4758 |
| 2020/0090009 | A1* | 3/2020 | Arora | G06F 18/23 |
| 2020/0326537 | A1* | 10/2020 | Busey | A42B 3/042 |
| 2021/0082098 | A1* | 3/2021 | Kumbhare | G06T 7/0004 |
| 2022/0084079 | A1* | 3/2022 | Stewart | G06N 5/04 |
| 2022/0116402 | A1* | 4/2022 | Chai | G06Q 50/01 |
| 2022/0122328 | A1* | 4/2022 | Giovannetti | G06T 7/70 |
| 2022/0174124 | A1* | 6/2022 | Kwatra | H04L 67/306 |
| 2022/0189150 | A1* | 6/2022 | Bentaieb | G16H 50/20 |
| 2022/0249868 | A1* | 8/2022 | Fay | G06F 21/6254 |

OTHER PUBLICATIONS

EPO, Written Opinion for International Patent Application No. PCT/US2021/063116, dated Mar. 31, 2022, 8 pages.

* cited by examiner

DETERMINING A VISUAL THEME IN A COLLECTION OF MEDIA ITEMS

CROSS-REFERENCE TO RELATED APPLICATIONS

The present application claims priority to U.S. Provisional Patent Application No. 63/187,390, filed May 11, 2021 and titled "Determining a Visual Theme from Pixels in a Collection of Media Items," and U.S. Provisional Patent Application No. 63/189,658, filed May 17, 2021 and titled "Determining a Visual Theme from Pixels in a Collection of Media Items," each of which is incorporated herein in its entirety.

BACKGROUND

Users of devices such as smartphones or other digital cameras capture and store a large number of photos and videos in their image libraries. Users utilize such libraries to view their photos and videos to reminisce about various events such as birthdays, weddings, vacations, trips, etc. Users may have large image libraries with thousands of images taken over a long time period.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method comprises: determining, based on pixels of images or videos from a collection of media items, clusters of media items such that the media items in each cluster have a visual similarity, wherein the collection of media items is associated with a user account; selecting a subset of the clusters of media from the clusters of media items based on corresponding media items in each cluster having a visual similarity within a range of threshold visual similarity values; and causing a user interface to be displayed that includes the subset of the clusters of media items.

In some embodiments, each media item has an associated timestamp, media items captured within a predetermined time period are associated with an episode, and selecting the subset of the clusters of media items is based on corresponding associated timestamps such that the corresponding media items in the subset of the clusters of media items meet a temporal diversity criteria that excludes more than a predetermined number of the corresponding media items from a particular episode. In some embodiments, the method further includes prior to selecting the subset of the clusters of media items, excluding from the collection of media items, media items that are associated with a category that is in a list of prohibited categories. In some embodiments, the method further includes prior to determining the clusters of media items, excluding media items that correspond to a category that is in a list of prohibited categories. In some embodiments, each media item is associated with a location and responsive to the subset of the clusters of media including more than a predetermined number of media items, selecting the subset of the clusters of media items is based on location such that the subset of the clusters meet a location diversity criteria. In some embodiments, the clusters of media items are further determined based on the corresponding media items being associated with labels that have a semantic similarity. In some embodiments, the method further includes scoring each media item in the subset of the clusters of media items based on analyzing a likelihood that a user associated with the user account performs a positive action with reference to the media item and selecting the media items in the subset of the clusters of media items based on a corresponding score meeting a threshold score. In some embodiments, the method further includes receiving feedback from the user about the subset of the clusters and modifying the corresponding score for the subset of the clusters of media items based on the feedback. In some embodiments, The method of claim 8, wherein the feedback includes an explicit action as indicated by removal of the one or more media items in the subset of the clusters of media items from the user interface or an implicit action as indicated by one or more of viewing the corresponding media items in the subset of the clusters of media items or sharing the corresponding media items in the subset of the clusters of media items. In some embodiments, the method further includes receiving aggregated feedback from users for aggregated subset of the clusters of media, providing the aggregated feedback to a machine-learning model, wherein parameters of the machine-learning model are updated, and modifying the clusters of media items based on updating the parameters of the machine-learning model. In some embodiments, the method further includes further comprising selecting a particular media item from each cluster in the subset of the clusters of media items as a cover photo for the each cluster in the subset of the clusters of media items based on the particular media item including a greatest number of objects corresponding to the visual similarity. In some embodiments, the method further includes adding a title to each cluster in the subset of the clusters of media items based on a type of the visual similarity and a commonly used phrase. In some embodiments, the user interface is displayed at predetermined intervals. In some embodiments, the method further includes providing a notification to a user associated with the user account that the subset of the clusters of media items is available, where the notification includes a corresponding title for each of the clusters in the subset of the clusters of media items. In some embodiments: the determining comprises generating a vector representation of each media item using a trained machine-learning model, a vector distance between vector representations of pairs of media items is indicative of the visual similarity of the media items, the vector representation is an embedding generated by the trained machine-learning model, and the clusters are selected such that the vector distance between each pair of media items within the cluster is outside the range of threshold visual similarity values.

In some embodiments, the method comprises: receiving as input, to a trained machine-learning model, media items from a collection of media items associated with a user account; generating, with the trained machine-learning model, output image embeddings for clusters of media items, wherein the media items in each cluster have a visual similarity and media items that have the visual similarity are nearer to each other in vector space than media items that are dissimilar, such that partitioning the vector space generates the clusters of media items; selecting a subset of the clusters of media from the clusters of media items based on corresponding media items in each cluster having a visual similarity within a range of threshold visual similarity values; and causing a user interface to be displayed that includes the subset of the clusters of media items.

In some embodiments, functional images are removed from the collection of media items before the collection of media items is provided to the trained machine-learning model. In some embodiments, the trained machine-learning model is trained with feedback from users that includes a reaction to a set of media items or a modification of a title of the set of media items.

Embodiments may further include a system comprising one or more processors and a memory that stores instructions executed by the one or more processors, the instructions comprising determining, based on pixels of images or videos from a collection of media items, clusters of media items such that the media items in each cluster have a visual similarity, wherein the collection of media items is associated with a user account; selecting a subset of the clusters of media items based on corresponding media items in each cluster having a visual similarity within a range of threshold visual similarity values; and causing a user interface to be displayed that includes the subset of the clusters of media items. In some embodiments, each media item has an associated timestamp, media items captured within a predetermined time period are associated with an episode, and selecting the subset of the clusters of media items is based on corresponding associated timestamps such that the corresponding media items in the subset of the clusters of media items meet a temporal diversity criteria that excludes more than a predetermined number of the corresponding media items from a particular episode.

Embodiments may further include a non-transitory computer readable medium includes instructions stored thereon that, when executed by one or more computers, cause the one or more computers to perform operations comprising: determining, based on pixels of images or videos from a collection of media items, clusters of media items such that the media items in each cluster have a visual similarity, wherein the collection of media items is associated with a user account; selecting a subset of the clusters of media from the clusters of media items based on corresponding media items in each cluster having a visual similarity within a range of threshold visual similarity values; and causing a user interface to be displayed that includes the subset of the clusters of media items.

The specification advantageously describes a way to identify clusters of similar images without having to manually identify images or manually provide categories of images.

BRIEF DESCRIPTION OF THE DRAWINGS

FIG. 3A illustrates a first set of media times that match a first visual theme of objects with a curved shape, a second visual theme with three images that are the same still-life painting, and a third visual theme of a cat inside a stuffed shark in different poses. FIG. 3B illustrates a fourth visual theme where the same object (backpack) is seen in each of the images taken in different places at different times, according to some embodiments described herein.

DETAILED DESCRIPTION

Network Environment 100

Figure 1:
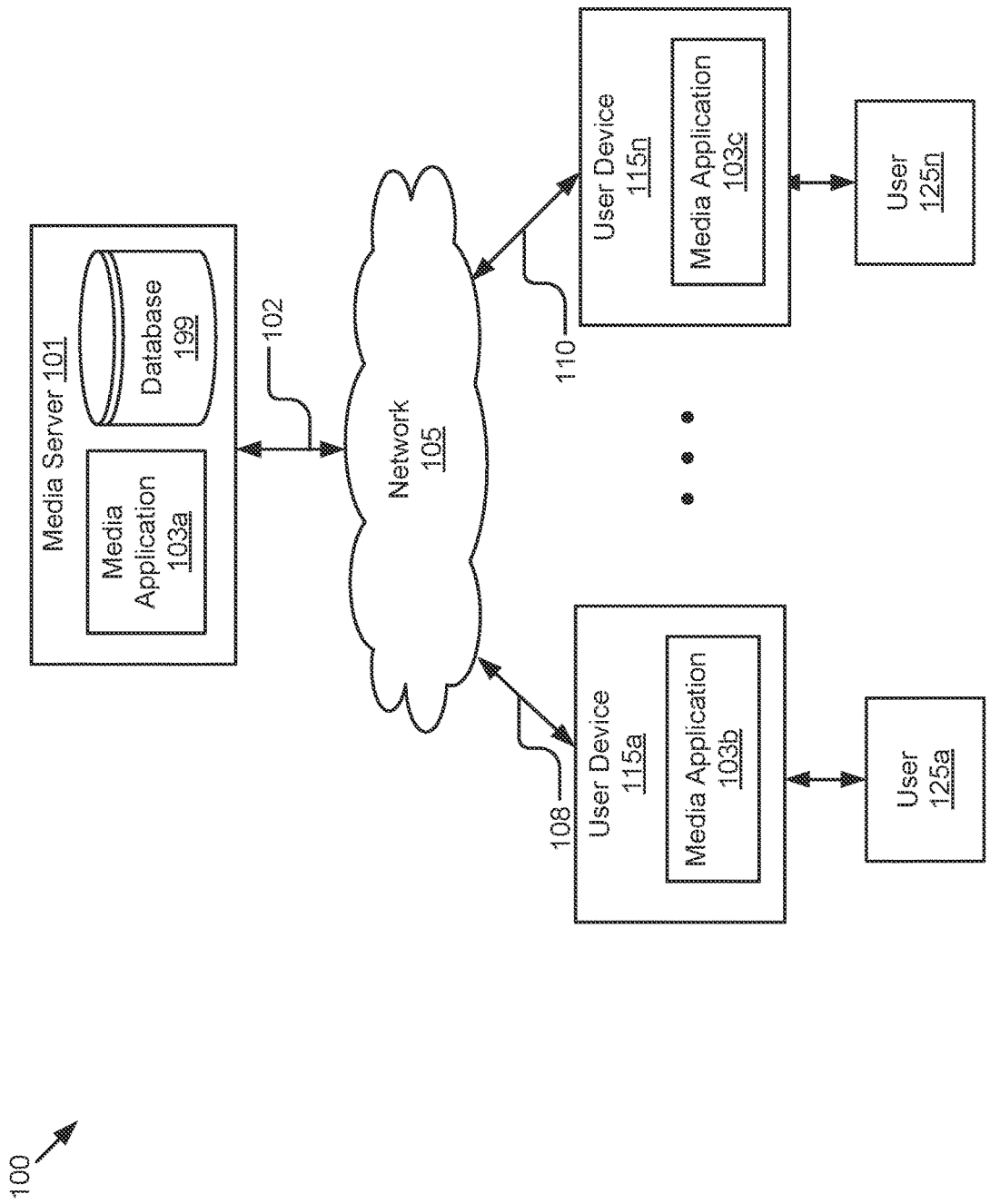
FIG. 1 is a block diagram of an example network environment, according to some embodiments described herein.

FIG. 1 illustrates a block diagram of an example environment 100. In some embodiments, the environment 100 includes a media server 101, a user device 115a, a user device 115n, and a network 105. Users 125a, 125n may be associated with respective user devices 115a, 115n. In some embodiments, the environment 100 may include other servers or devices not shown in FIG. 1 or the media server 101 may not be included. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The media application 103a may include code and routines operable to determine, with user permission, and based on pixels of images or videos from a collection of media items, clusters of media items such that the media items in each cluster have a visual similarity, where the collection of media items is associated with a user account. For example, one cluster may have objects with a similar shape and color, another cluster may have parks with similar environmental attributes, and another cluster may have images of a pet in different situations. The media application 103a selects a subset of the clusters of media items based on corresponding media items in each cluster having the visual similarity within a range of threshold visual similarity values. The media application 103a a user interface to be displayed that includes the subset of the clusters of media items.

In some embodiments, the media application 103a may be implemented using hardware including a central processing unit (CPU), a field-programmable gate array (FPGA), an application-specific integrated circuit (ASIC), any other type of processor, or a combination thereof. In some embodiments, the media application 103a may be implemented using a combination of hardware and software.

The database 199 may store a collection of media associated with a user account, training sets for a machine-learning model, user actions associated with the media (viewing, sharing, commenting, etc.). The database 199 may store media items that are indexed and associated with identities of the users 125 of the user devices 115. The database 199 may also store social network data associated with users 125, user preferences for the users 125, etc.

The user device 115 may be a computing device that includes a memory and a hardware processor. For example, the user device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. The media application 103 may be stored as media application 103b on the user device 115a or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

Figure 3A:
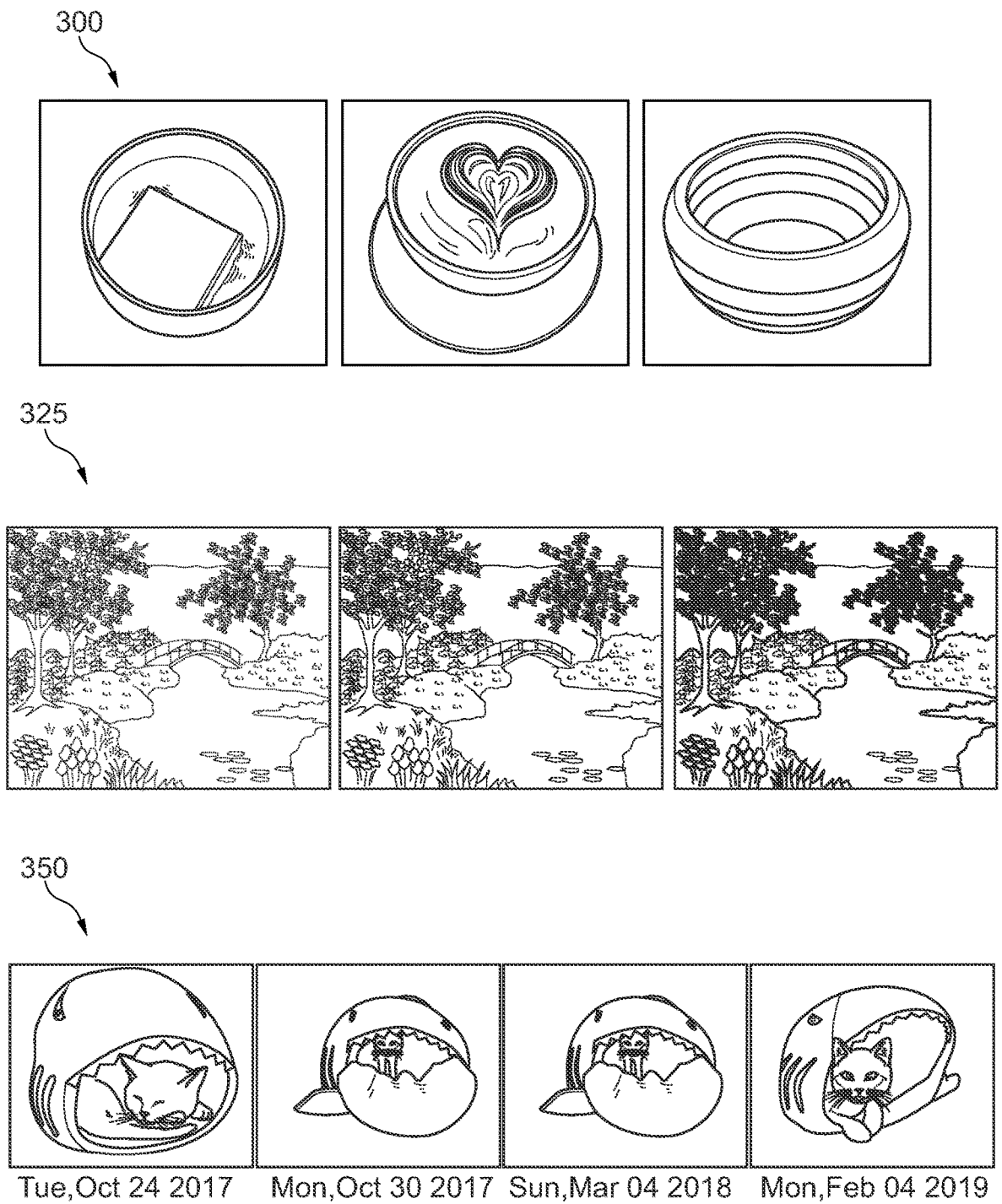
FIGS. 3A-B illustrate various example sets of media items that each match a particular visual theme, according to some embodiments.

In some embodiments, a user account includes a collection of media items. For example, a user captures images and video from their camera (e.g., smartphone or other camera), uploads images from a digital single lens reflex (DSLR) camera, adds media captured by another user that is shared with them to their collection of media items, etc. A media application 103 determines, based on pixels of images or videos from the collection of media items, clusters of media items such that the media items in each cluster have a visual similarity. For example, FIG. 3A illustrates a first visual theme 300 of images with visual similarity as brown objects with a curved shape. Specifically, the first object is a drink with ice in a glass, the second object is a latte with a heart in a coffee cup, and the third object is a bowl made with different shades of brown wood. Other examples may include mountain ranges, nature arches, ocean waves with a human, parallel lines extending in to the horizon (e.g., train tracks, roads, etc.), changes over time (plant growth, sun's motion, painting in progress), etc.

The clusters of media items may include images from the same episode, such as when a user takes multiple images of the same art piece, but at different angles. For example, FIG. 3A includes a second example 325 with three images that are the same still-life painting shot in different ways such that the leaves on the trees are progressively more distinguishable in the three images.

Figure 3B:

The media application 103 a subset of the clusters of media items based on corresponding media items in each cluster having the visual similarity within a range of threshold visual similarity values. The threshold of visual similarity may be between media items that are extremely similar to media items that are more similar than items that only have a distant relation. For example, the theme in the first example 300 in FIG. 3A is brown circular objects. This may be in the middle of the range of threshold similarity values. Conversely, a third example 350 in FIG. 3A is a cluster of media items with the theme of a cat inside a stuffed shark taken at different time periods. This is a more visually similar theme. A fourth example 375 in FIG. 3B includes a theme of an orange backpack used while the person goes on different trips. Yet another example that may be closer to the threshold similarity value for extremely similar media is where the media items are slightly differently shaped pink flowers.

When media items are not sufficiently visually similar, it may be difficult to discern a theme among the media items and, as a result, they may appear more like a collection of random media items than something interesting for the user to view. In some embodiments, the media application 103 limits the number of media items to keep the visual theme more consistent as well so that the collection does not look like, for example, a grouping of all the cat images available in a user's library.

The media application 103 may cause a user interface to be displayed that includes the subset of the clusters of media items. In some embodiments, the media application 103 displays the user interface that includes the subset of the clusters of media items at predetermined intervals. For example, the media application 103 may display the user interface with the subset of the clusters every day, every week, once a month, etc. The media application 103 may modify the frequency of displaying the subset of the clusters based on feedback. For example, if a user views the subset of the clusters every time they are available, the media application 103 may maintain the frequency of display, but if the user views the subset of the clusters less frequently, the media application 103 may decrease the frequency of the display.

The media application 103 may also provide a notification to a user associated with the user account that the subset of the clusters is available with a corresponding title for the subset of the clusters. For example, the media application 103 may provide a daily notification, a weekly notification, a monthly notification, etc. to the user. In some embodiments, the user interface includes an option for limiting the frequency of the notification and/or the display of the subset of the clusters of media items.

Computing Device Example 200

Figure 2:
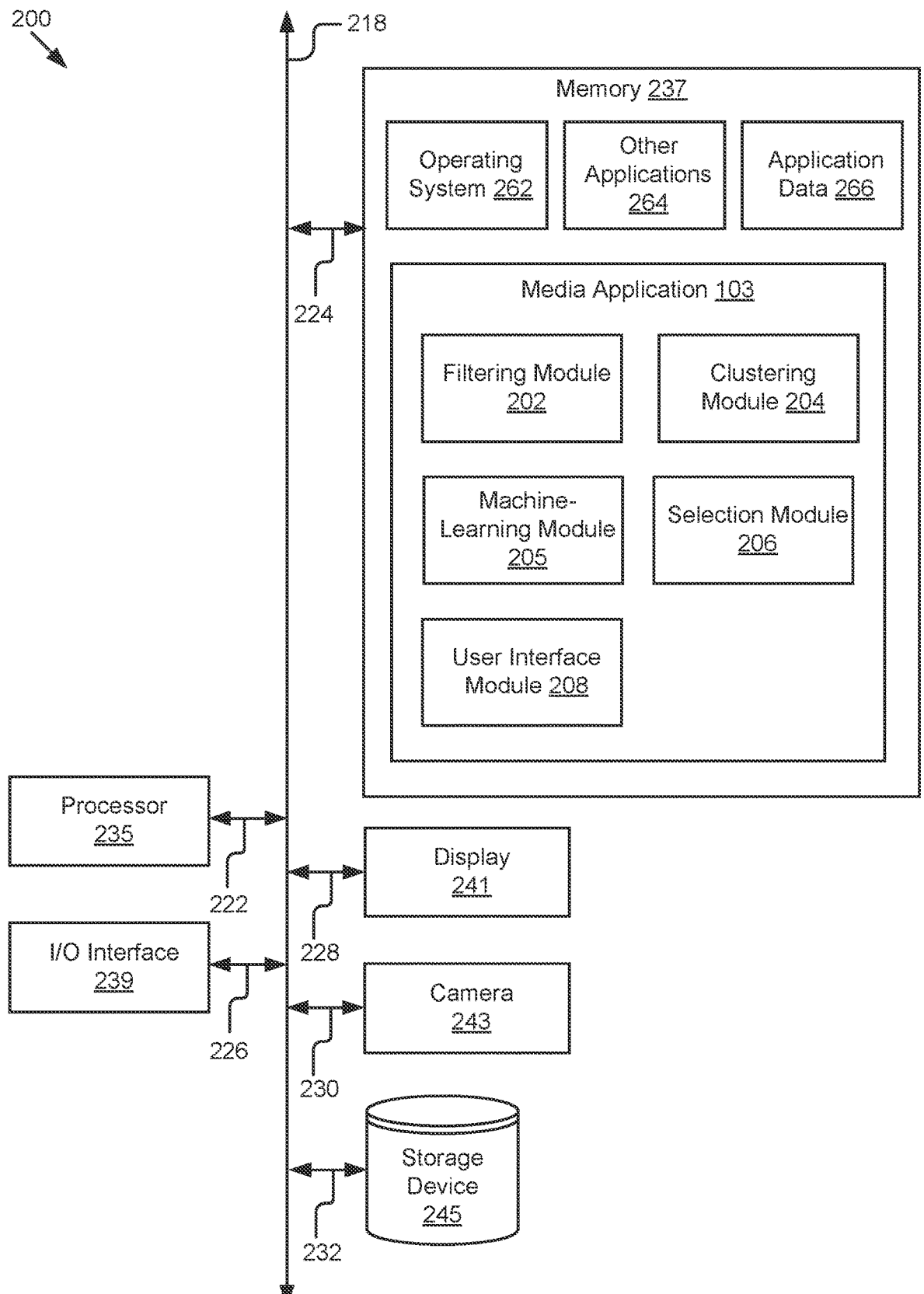
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is a user device 115 used to implement the media application 103. In another example, computing device 200 is the media server 101. In yet another example, the media application 103 is in part on the user device 115 and in part on the media server 101.

One or more methods described herein can be run in a standalone program that can be executed on any type of computing device, a program run on a web browser, a mobile application ("app") run on a mobile computing device (e.g., cell phone, smart phone, smart display, tablet computer, wearable device (wristwatch, armband, jewelry, headwear, virtual reality goggles or glasses, augmented reality goggles or glasses, head mounted display, etc.), laptop computer, etc.). In the primary example, all computations are performed within a mobile application on a mobile computing device. However, it is also possible to use a client/server architecture, e.g., a mobile computing device sends user input data to a server device and receives from the server the final output data for output (e.g., for display). In another example, computations can be split between the mobile computing device and one or more server devices.

In some embodiments, computing device 200 includes a processor 235, a memory 237, a I/O interface 239, a display 241, a camera 243, and a storage device 245. The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., a camera application, an image library application, an image management application, an image gallery application, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware for the computing device 200. For example, the application data 266 may include images captured by the camera 243, user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or database 199), and input/output devices can communicate via I/O interface 239. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). For example, when a user provides touch input, I/O interface 239 transmits the data to the media application 103.

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes a subset of clusters of media items. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store the collection of media items associated with a user account, the subset of the clusters of media, training sets for a machine-learning model, etc. In embodiments where the media application 103 is part of the media server 101, the storage device 245 is the same as the database 199 in FIG. 1.

Example Media Application 103

FIG. 2 illustrates an example media application 103 that includes a filtering module 202, a clustering module 204, a machine-learning module 205, a selection module 206, and a user interface module 208. In some embodiments, the media application 103 uses either the clustering module 204 or the machine-learning module 205.

The filtering module 202 excludes media items from a collection of media items that correspond to a category that is in a list of prohibited categories. In some embodiments, the filtering module 202 includes a set of instructions executable by the processor 235 to exclude media items corresponding to the category that is in a list of prohibited categories. In some embodiments, the filtering module 202 is stored in the memory 237 of the computing device 200 and can be accessible and executable by the processor 235.

In some embodiments, the filtering module 202 excludes the media from the collection of media items before the clustering module 204 performs clustering. In alternate embodiments, the filtering module 202 excludes the media from the collection of media items after the clustering module 204 performs the clustering. For example, the filtering module 202 excludes the media items that are associated with visual similarity to a category from a list of prohibited categories. The list of prohibited categories may include media items that are captured not for their photographic value but as functional images, such as images of receipts, documents, parking meters, screenshots, etc.

In some embodiments where the media application 103 includes the machine-learning module 205, the filtering module 202 removes functional images from the collection of media items before the collection of media items is provided to the machine-learning model. For example, the filtering module 202 removes receipts, instructions, documents, and screenshots before the collection of media items is provided to the machine-learning model.

The clustering module 204 determines, based on pixels of images or videos from a collection of media items, clusters of media items such that the media items in each cluster have a visual similarity. In some embodiments, the clustering module 204 includes a set of instructions executable by the processor 235 to generate clusters of media items. In some embodiments, the clustering module 204 is stored in the memory 237 of the computing device 200 and can be accessible and executable by the processor 235.

In some embodiments, the clustering module 204 accesses the collection of media items associated with a user account, such as a library associated with a user. In instances where the filtering module 202 excluded media items, the clustering module 204 accesses the collection of media items without the media items corresponding to the list of prohibited categories. The clustering module 204 may determine, based on pixels of images or videos from the collection of media items, clusters of media items such that the media items in each cluster have a visual similarity. In some embodiments, the clustering uses an N-dimensional Gaussian diversity function to determine visual similarity.

In some embodiments, the machine-learning module 205 includes a machine-learning model that is trained to generate output image embeddings for clusters of media such that the media items in each cluster have a visual similarity. In some embodiments, the machine-learning module 205 includes a set of instructions executable by the processor 255 to generate the image embeddings. In some embodiments, the machine-learning module 205 is stored in the memory 257 of the computing device 200 and can be accessible and executable by the processor 255.

In some embodiments, the machine-learning module 205 may determine visual similarity in clusters using vectors in a multidimensional feature space (embedding). Images with similar features may have similar feature vectors, e.g., vector distance between the feature vectors of such images may be lower than the vector distance between dissimilar images. The feature space may be a function of various factors of the image, e.g., the depicted subject matter (objects detected in the image), composition of the image, color information, image orientation, image metadata, specific objects recognized in the image (e.g., with user permission, a known face), etc.

In some embodiments, training may be performed using supervised learning. In some embodiments, the machine-learning module 205 includes a set of instructions executable by the processor 255. In some embodiments, the machine-learning module 205 is stored in the memory 257 of the computing device 200 and can be accessible and executable by the processor 255.

In some embodiments, the machine-learning module 205 may use training data (obtained with permission for the purposes of training) to generate a trained model, specifically, a machine-learning model. For example, training data may include ground truth data in the form of clusters of media that are associated with descriptions of the visual similarity of the clusters. In some embodiments, the descriptions of the visual similarity may include feedback from users about whether the clusters are related and include a clear theme. In some embodiments, the descriptions of the visual similarity may be automatically added by image analysis. Training data may be obtained from any source, e.g., a data repository specifically marked for training, data for which permission is provided for use as training data for machine-learning, etc.

In some embodiments, training data may include synthetic data generated for the purpose of training, such as data that is not based on activity in the context that is being trained, e.g., data generated from simulated or computer-generated images/videos, etc. In some embodiments, the machine-learning module 205 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The machine-learning module 205 may read the data file for the trained model and implement neural networks with node connectivity, layers, and weights based on the model structure or form specified in the trained model.

The machine-learning module 205 generates a trained model that is herein referred to as a machine-learning model. In some embodiments, the machine-learning module 205 is configured to apply the event machine-learning model to data, such as application data 266 (e.g., input media), to identify one or more features in an input media item and to generate a feature vector (embedding) representative of the media item. In some embodiments, the machine-learning module 205 may include software code to be executed by processor 255. In some embodiments, the machine-learning module 205 may specify circuit configuration (e.g., for a programmable processor, for a field programmable gate array (FPGA), etc.) enabling processor 255 to apply the machine-learning model. In some embodiments, the machine-learning module 205 may include software instructions, hardware instructions, or a combination. In some embodiments, the machine-learning module 205 may offer an application programming interface (API) that can be used by the operating system 262 and/or other applications 264 to invoke the machine-learning module 205, e.g., to apply the machine-learning model to application data 266 to output the image embeddings for clusters of media. In some embodiments, the media items that match the visual similarity are nearer to each other in vector space than images that are dissimilar, such that partitioning the vector space generates the clusters of media items.

In some embodiments, the machine-learning model is a classifier that takes as input the collection of media items. Examples of classifiers include neural-networks, support vector machines, k-nearest neighbor, logistic regression, naïve bayes, decision trees, perceptron, etc.

In some embodiments, the machine-learning model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (CNN) (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data 266. Such data can include, for example, one or more pixels per node, e.g., when the machine-learning model is used for analysis, e.g., an input image, such as a first image associated with a user account. Subsequent intermediate layers may receive as input, output of nodes of a previous layer per the connectivity specified in the model form or structure. These layers may also be referred to as hidden layers. A final layer (e.g., output layer) produces an output of the machine-learning model. For example, the output may be image embeddings for clusters of media. In some embodiments, the model form or structure also specifies a number and/or type of nodes in each layer.

The features output by the machine-learning module 205 may include a subject (e.g., sunset vs. a particular person); colors present in an image (a green hill vs. a blue lake); color balance; lighting source, angles, and intensity; a position of objects in the image (e.g., adherence to the rule of thirds); position of objects relative to each other (e.g., depth of field), location of the shot; focus (foreground vs. background); or shadows. While the foregoing features are human-understandable, it will be understood that the features output may be embeddings or other mathematical values that are representative of the image and are not human parseable (e.g., no individual feature value may correspond to a particular feature such as colors present, object position, etc.); however, the trained model is robust to images such that similar features are output for similar images, and images with significant dissimilarities have correspondingly dissimilar features.

In some embodiments, the model form is a CNN with network layers where each network layer extracts image features at different levels of abstraction. A CNN that is used to identify features in an image may be used for image classification. The model architecture may include combinations and orderings of layers made up of multi-dimensional convolutions, average pooling, max pooling, activation functions, normalization, regularization, and other layers and modules used in practice for applied deep neural networks.

In different embodiments, the machine-learning model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. For example, the machine-learning module 205 may adjust a respective weight based on feedback responsive to automatically updating the one or more parameters of the machine-learning model.

In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processor cores of a multicore processor, using individual processing units of a graphical processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain state that permits the node to act like a finite state machine (FSM). Models with such nodes may be useful in processing sequential data, e.g., words in a sentence or a paragraph, a series of images, frames in a video, speech or other audio, etc. For example, a heuristics-based model used in the gating model may store one or more previously generated features corresponding to previous images.

In some embodiments, the machine-learning model may include embeddings or weights for individual nodes. For example, the machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The machine-learning model may then be trained, e.g., using the training set of clusters of media, to produce a result. In some embodiments, subsets of the total architecture may be reused from other machine-learning applications as a transfer learning approach in order to leverage pre-trained weights.

For example, training may include applying supervised learning techniques. In supervised learning, the training data can include a plurality of inputs (e.g., media items from a collection of media items associated with a user account) and a corresponding expected output for each input (e.g., image embeddings for clusters of media). Based on a comparison of the output of the machine-learning model with the expected output, values of the weights are automatically adjusted, e.g., in a manner that increases a probability that the machine-learning model produces the expected output when provided similar input.

In some embodiments, training may include applying unsupervised learning techniques. In unsupervised learning, only input data (e.g., media items from a collection of media items associated with a user account) may be provided and the machine-learning model may be trained to differentiate data, e.g., to cluster features of the images into a plurality of groups, where each group.

In various embodiments, a trained model includes a set of weights, corresponding to the model structure. In embodiments where a training set of ultrasound portions and audible portions is omitted, the machine-learning module 205 may generate a machine-learning model that is based on prior training, e.g., by a developer of the machine-learning module 205, by a third-party, etc. In some embodiments, the machine-learning model may include a set of weights that are fixed, e.g., downloaded from a server that provides the weights.

In some embodiments, the machine-learning module 205 may be implemented in an offline manner. In these embodiments, the machine-learning model may be generated in a first stage and provided as part of the machine-learning module 205. In some embodiments, small updates of the machine-learning model may be implemented in an online manner. In such embodiments, an application that invokes the machine-learning module 205 (e.g., operating system 262, one or more of other applications 264, etc.) may utilize the image embeddings for clusters of media items in order to identify visually similar clusters. The machine-learning module 205 may also generate system logs periodically, e.g., hourly, monthly, quarterly, etc. and may be used to update the machine-learning model, e.g., to update embeddings for the machine-learning model.

In some embodiments, the machine-learning module 205 may be implemented in a manner that can adapt to a particular configuration of computing device 200 on which the machine-learning module 205 is executed. For example, the machine-learning module 205 may determine a computational graph that utilizes available computational resources, e.g., processor 255. For example, if the machine-learning module 205 is implemented as a distributed application on multiple devices, the machine-learning module 205 may determine computations to be carried out on individual devices in a manner that optimizes computation. In another example, the machine-learning module 205 may determine that processor 255 includes a GPU with a particular number of GPU cores (e.g., 1000) and implement the machine-learning module 205 accordingly (e.g., as 1000 individual processes or threads).

In some embodiments, the machine-learning module 205 may implement an ensemble of trained models. For example, the machine-learning model may include a plurality of trained models that are each applicable to the same input data. In these embodiments, the machine-learning module 205 may choose a particular trained model, e.g., based on available computational resources, success rate with prior inferences, etc.

In some embodiments, the machine-learning module 205 may execute a plurality of trained models. In these embodiments, the machine-learning module 2754 may combine outputs from applying individual models, e.g., using a voting-technique that scores individual outputs from applying each trained model, or by choosing one or more particular outputs. In some embodiments, such a selector is part of the model itself and functions as a connected layer in between the trained models. Further, in these embodiments, the machine-learning module 205 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning module 205, e.g., by operating system 262 or one or more applications 264.

In some embodiments, the machine-learning module 205 receives feedback. For example, the machine-learning module 205 may receive feedback via the user interface module 258 from one user or a set of users. If a single user provides feedback, the machine-learning module 205 provides the feedback to the machine-learning model, which uses the feedback to update parameters of the machine-learning model to modify the output image embeddings for clusters of media items. In cases where a set of users provide feedback, the machine-learning module 205 provides the aggregated feedback to the machine-learning model that uses the aggregated feedback to update parameters of the machine-learning model to modify the output image embeddings for clusters of media items. For example, the aggregated feedback may include a subset of the clusters of media and how users reacted to the subset of the clusters of media by viewing only one image and declining to view the rest of the media, viewing all of the corresponding media items in the subset, sharing corresponding media items, providing an indication of approval or disapproval (e.g., thumbs up/thumbs down, like, +1, etc.) of corresponding media items, removal/addition of an individual media item from the subset of clusters of media items, modifying the title, etc. The machine-learning module 205 may modify the clusters of media based on updating the parameters of the machine-learning module.

In some embodiments, the machine-learning model is trained with feedback from users where the feedback includes a reaction to a subset of the clusters and a modification of a title of one of the clusters in the subset. The machine-learning module 205 provides the feedback to the machine-learning model to modify parameters to exclude clusters of media items with certain types of visual similarity (e.g., separate images of waves on the ocean are visually similar but not the type of media that a user is likely to view versus images of a surfer on waves at different times and/or in different locations).

The selection module 206 selects a subset of the clusters of media items based on the visual similarity determined by the clustering module 204. In some embodiments, the selection module 206 includes a set of instructions executable by the processor 235 to select the subset of the clusters of media items. In some embodiments, the selection module 206 is stored in the memory 237 of the computing device 200 and can be accessible and executable by the processor 235.

In some embodiments, the selection module 206 selects the subset of the clusters of media items where the media items have a visual similarity within a range of threshold visual similarity values. For example, the range may be between 0.05 to 0.3 out of a range of 0-4. Other ranges and scales are possible. The subset of the clusters of media items within the range of threshold visual similarity values may be considered to have a visual theme that is recognized to be related and cohesive.

In some embodiments, where the clusters of media items exceed a predetermined number (e.g., more than 15 media items), the selection module 206 may impose additional restrictions during selection of the subset of the clusters of media items. For example, the selection module 206 may impose temporal diversity by identifying a timestamp associated with each media item, identifying that multiple media items are associated with a same episode based on the timestamps (e.g., media items that are associated with a same time period and a same location), and selecting the subset of the clusters of media items is based on the associated timestamps such that the subset of the clusters of media items meets a temporal diversity criteria that excludes more than a predetermined number of media items from a particular episode (i.e., selects the subset of the clusters of media items based on associated timestamps such that no more than a particular number (e.g., three) of media items are not associated with the same episode). This avoids a cluster of media items that are too similar and possibly duplicates because the user took several images of an object around the same time period and at the same location. This also avoids a situation where the user took the same image and edited it, for example, for a posting on a different photo-sharing application. The selection module 206 may use temporal diversity to select a subset of the clusters that shows progress of an object over a timespan. For example, the cluster could include different images of a child at different time periods to show the child growing larger or different images of a plant from a seedling to a flowering bush.

Figure 4:
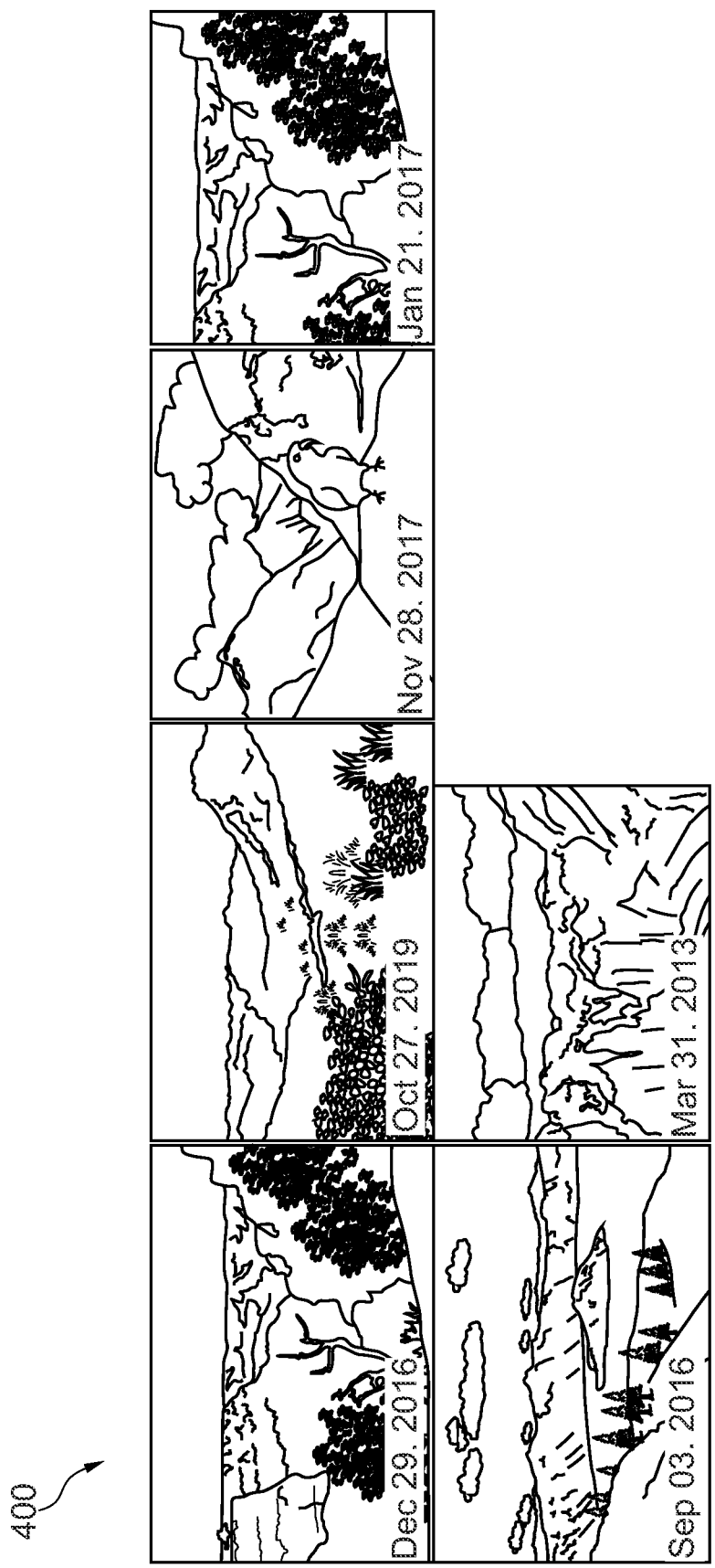
FIG. 4 includes an example of a visual theme of natural images of different mountain ranges with both temporal diversity and location diversity, according to some embodiments.

In some embodiments, the selection module 206 imposes location diversity on the subset of the clusters of media. For example, the selection module 206 may identify a location associated with each media item and where a number of corresponding media items available for a cluster exceed a predetermined number (e.g., more than 10 media items), the selection module 206 selects the subset of the clusters of media items based on locations such that the subset of the clusters of media items meets a location diversity criteria. FIG. 4 includes an example 400 of a visual theme of natural images of different mountain ranges with both temporal diversity, because the images were captured in different months and years, and location diversity, because the images were captured in different locations. Even though there are two types of diversity in the images, a hidden similarity emerges through the visual theme.

In some embodiments, the selection module 206 imposes a semantic theme on the subset of the clusters of media. The selection module 206 may identify labels associated with the images and groups a subset of the clusters of media items based on the corresponding media items having the same or similar labels. For example, the selection module 206 may use the labels identifying a depiction of a dog in images in order to select a subset of the clusters of media items of the dog from being a puppy until adulthood. In some embodiments, the media application 103 combines the semantic theme of Golden Gate Bridge with the visual theme of other bridges that are visually similar to the golden tones of the Golden Gate Bridge.

In some embodiments, the selection module 206 scores each media item in the subset of the clusters of media items based on analyzing a likelihood that a user associated with the user account performs a positive action with reference to the media item. The positive action may include viewing the subset, sharing the subset, ordering prints from the subset, etc. The selection module 206 may score a media item as being associated with a likelihood that a user associated with the user account will perform a positive action if the subject matter is more interesting, for example, if the subject matter includes babies, people the user knows, places the user visited, etc. Conversely, the selection module 206 may determine that the user is less likely to perform a positive action associated with certain subjects, for example, static objects, such as bunk beds. In some embodiments, the selection module 206 scores the subset of the clusters of media items based on personalized information that relate to the user or based on aggregated information about how users in general react to media. In some embodiments, the selection module 206 scores media items based on quality issues, such as being too blurry, since that decreases a likelihood that a user associated with the user account will perform a positive action associated with the media item.

The selection module 206 may select the media items in the subset of the clusters of media items if a corresponding score for each media item meets a threshold score. In some embodiments, the threshold score is a static value that is identical for all users. In some embodiments, the threshold score is specific to a user. In some embodiments, the threshold score is specified by a user.

Once the selection module 206 determines the subset of the clusters, the selection module 206 may instruct the user interface module 208 to cause a user interface to be displayed that includes the subset of the clusters. In some embodiments, a user may provide feedback related to the subset of the clusters. For example, the user may view the subset, provide an indication of approval of the subset, share the subset, order a printed picture from the subset, etc.

In some embodiments, the selection module 206 receives the feedback and modifies the corresponding score for the subset of the clusters of media items based on the feedback. For example, the feedback may include an explicit action as indicated by removal of the subset of the clusters from the user interface or an implicit action as indicated by one or more of viewing the subset of the clusters, viewing a subset of the clusters, or sharing the subset of the clusters. In some embodiments, the selection module 206 may identify a pattern in the feedback. For example, if positive feedback occurs when objects in the clusters are of a certain type (babies, family members, trees, etc.), the selection module 206 may modify the score so that the subset of clusters includes similar types of objects. In another example, the pattern may indicate that a user prefers themes with less visual similarity than more visual similarity and the selection module 206 may modify the score so that themes with less visual similarity are selected more frequently.

In some embodiments, the selection module 206 may receive feedback from a set of users that use the media application 103 and aggregate the feedback. For example, the selection module 206 may create aggregated feedback from users for a subset of the clusters of media and the selection module 206 modifies the scoring based on the aggregated feedback.

The user interface module 208 generates a user interface. In some embodiments, the user interface module 208 includes a set of instructions executable by the processor 235 to generate the user interface. In some embodiments, the user interface module 208 is stored in the memory 237 of the computing device 200 and can be accessible and executable by the processor 235.

Figure 5:
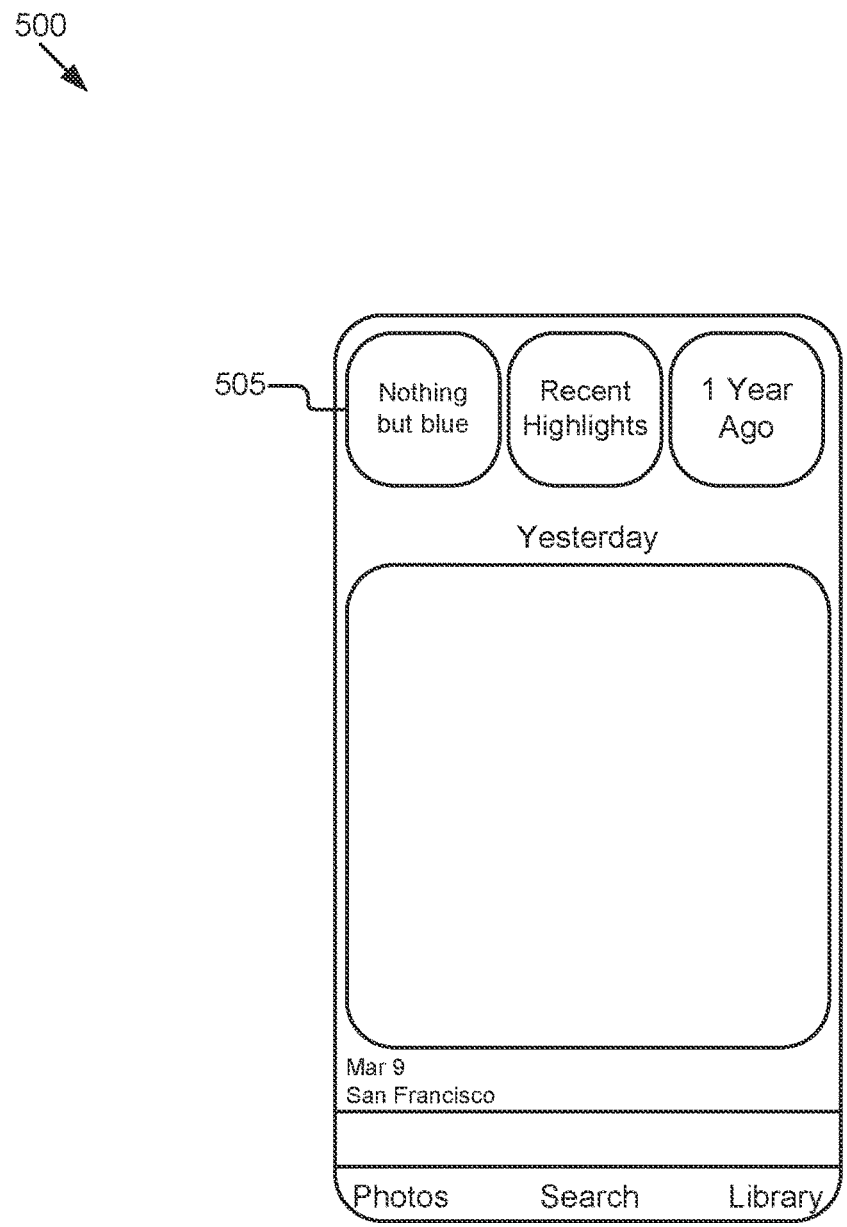
FIG. 5 includes an example of a user interface that includes a cluster with a visual theme, according to some embodiments described therein.

The user interface module 208 causes a user interface to be displayed that includes the subset of the clusters of media. FIG. 5 includes an example 500 of a user interface that includes a cluster 505 with a visual theme, according to some embodiments described therein. In this example, the cluster 505 is displayed at the top of the user interface along with a group of recent highlights and a group of images from one year ago. The user interface 500 also includes an image that was taken yesterday (March 9$^{th}$) in San Francisco.

In some embodiments, the user interface module 208 generates a user interface for viewing, editing, and sharing media that also suggests the subset of the clusters. For example, the user interface may include the clusters at the top of the user interface as illustrated in FIG. 5 and then when a user selects an image, the user interface includes options for editing or sharing the image.

In some embodiments, in response to a user selecting a cluster in the user interface, the user interface module 208 displays corresponding media items from the cluster at predetermined intervals. For example, the user interface module 208 may display each media item for two seconds, three seconds, etc.

In some embodiments, the user interface module 208 presents the subset of the clusters with a cover photo. The cover photo may be the most recent photo, the most highly scored photo, etc. In some embodiments, the user interface module 208 selects a particular media item from each cluster in the subset of the clusters of media items as a cover photo for the each cluster in the subset of the clusters of media items based on the particular media item including a greatest number of objects corresponding to the visual similarity. For example, a cluster may have a visual theme of a group of people skiing and the user interface module 208 may select a cover photo for the cluster that shows an image that depicts the highest number of the people from the cluster while they are skiing. In another example, where the cluster has a visual theme of people involved in outdoor activities in the water, the user interface module 208 may determine that an image of a person surfing is the most topical media item for the cover as compared with other images where people are near the water instead of being in the water (e.g., making sand castles or people are not engaged in more active outdoor activities (e.g., tanning along the water). The user interface module 208 may also select a cover photo based on having the highest visual quality (e.g., sharp, high resolution, not blurry, good exposure, etc.) from the cluster.

In some embodiments, the user interface module 208 adds a title to each cluster in the subset of the clusters of media items based on a type of the visual theme and/or a template phrase. For example, the title may refer to actions occurring in the image (e.g., surf's up for an ocean cluster, into the blue for a sky cluster, on the road for a cluster with roads, stairway to heaven for images in churches); food metaphors (e.g., mixed nuts, smorgasbord, mixed bag, goody bag, wine flight, cheese pairing, sampler, treasure trove, overlooked treasures, have a drink); a photo trail (e.g., photo detective, photo mystery, mystery photos, photo sphinx); creative combinations; correlations (e.g., connections, photos of a feather, photo club, photoweaving, patternish, coincidence, cause and effect, slot machine, one of these things is like the others, parallels); titles that refer to the pattern (e.g., beta patterns, pattern hunter, little patterns, pattern portal, connect the dots, picture patterns, photo patterns); synonyms for patterns, such as a theme (e.g., photostory, a story in photos, photo tales, a tale of two photos, photo theme, lucky theme), a set (e.g., photo set, a surprise set), or a match (e.g., memory match); onomatopoeia (e.g., zig-zag, boom, ka-pow, zap, zap photos, photo zap, photozap); verbs (e.g., look what we found in the couch cushions, look what appeared, help us sleuth, will it blend, time flies, some things never change); or a title for a clusters that references a connection where the selection module has a higher confidence score that the inferences are correct (e.g., magic pattern, I'm feeling lucky). In some embodiments, the template phrase may be a fun or a commonly used phrase that is more colloquial and engaging than just adding a title like "Birthdays 1997-2001." In some embodiments, the user interface module 208 may also include a title with a generic title, such as "Look what we found" and a subtitle that identifies the theme, such as "your orange backpack brought you far" for the fourth example 375 in FIG. 3B.

In some embodiments, the user interface module 208 provides a notification to a user associated with the user account that the subset of the clusters is available for viewing. The user interface module 208 may provide the notification periodically, such as every day, week, month, etc. In some embodiments, where a user stops viewing the notifications when the notifications are provided every day (week, month, etc.), the user interface module 208 may generate the notification less frequently. The user interface module 208 may additionally provide the notification with a corresponding title for the subset of the clusters.

Example Flowcharts

Figure 6:
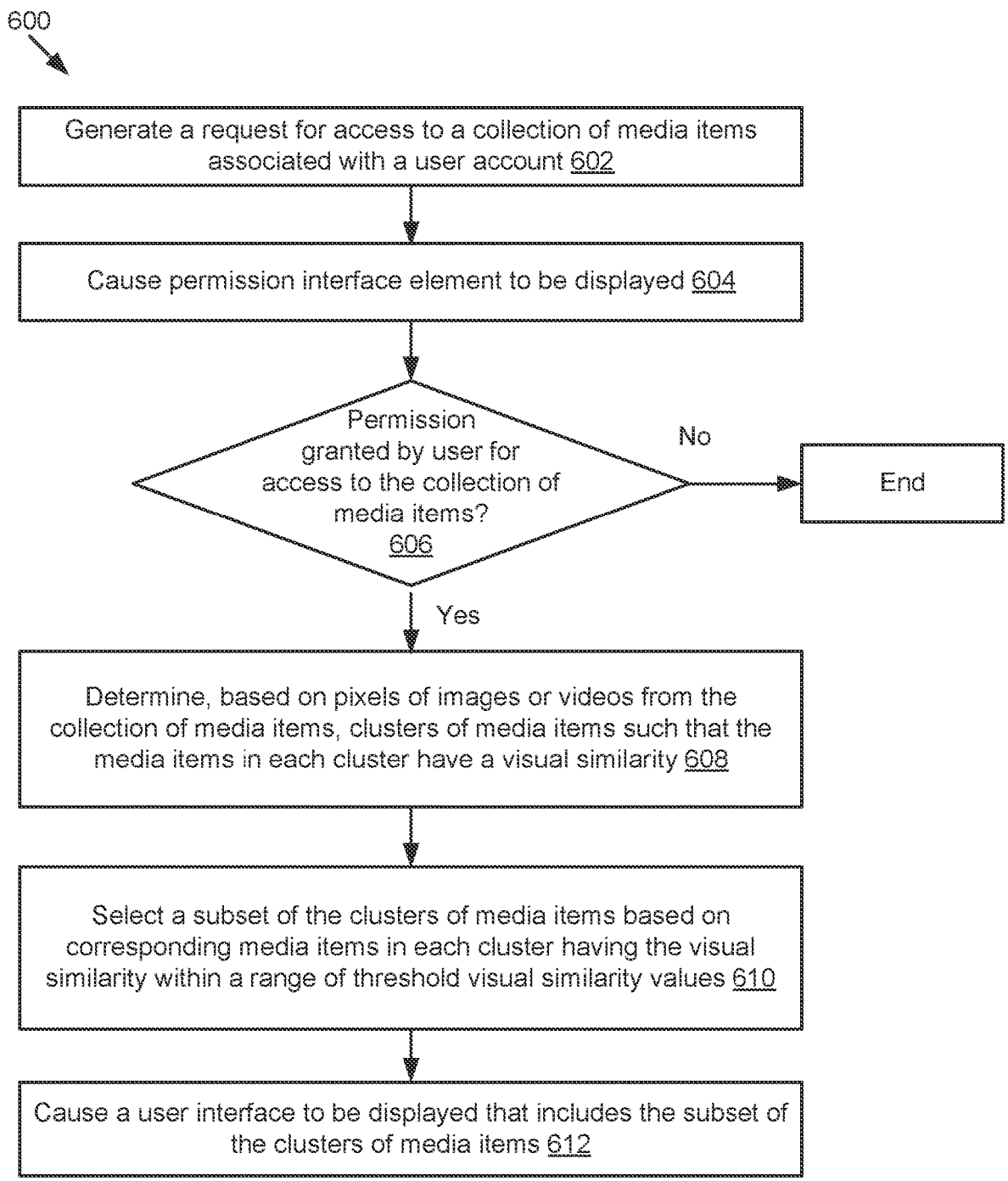
FIG. 6 is a flow diagram illustrating an example method for displaying a subset of the clusters of media items, according to some embodiments described therein.

FIG. 6 is a flow diagram illustrating an example method 600 for displaying a subset of the clusters of media items, according to some embodiments. The method illustrated in flowchart 600 may be performed by the computing device 200 in FIG. 2.

The method 600 may begin at block 602. In block 602, a request is generated for access to a collection of media items associated with a user account. In some embodiments, the request is generated by the user interface module 208. Block 602 may be followed by block 604.

At block 604, a permission interface element is caused to be displayed. For example, the user interface module 208 may display a user interface that includes a permission interface element requesting that the user provide permission to access the collection of media items. Block 604 may be followed by block 606.

At block 606, it is determined whether permission was granted by the user for access to the collection of media items. In some embodiments, block 606 is performed by the user interface module 208. If the user does not provide permission, the method ends. If the user does provide permission, block 606 may be followed by block 608.

At block 608, based on pixels of images or videos from a collection of media items, clusters of media items are determined such that the media items in each cluster have a visual similarity, where the collection of media items is associated with a user account. In some embodiments, block 606 is performed by the clustering module 204. Block 608 may be followed by block 610.

In block 610, a subset of the clusters of media items are selected based on corresponding media items in each cluster having the visual similarity within a range of threshold visual similarity values. In some embodiments, block 610 is performed by the selection module 206. Block 610 may be followed by block 612.

In block 612, a user interface is caused to be displayed that includes the subset of the clusters of media. In some embodiments, block 610 is performed by the user interface module 208.

Figure 7:
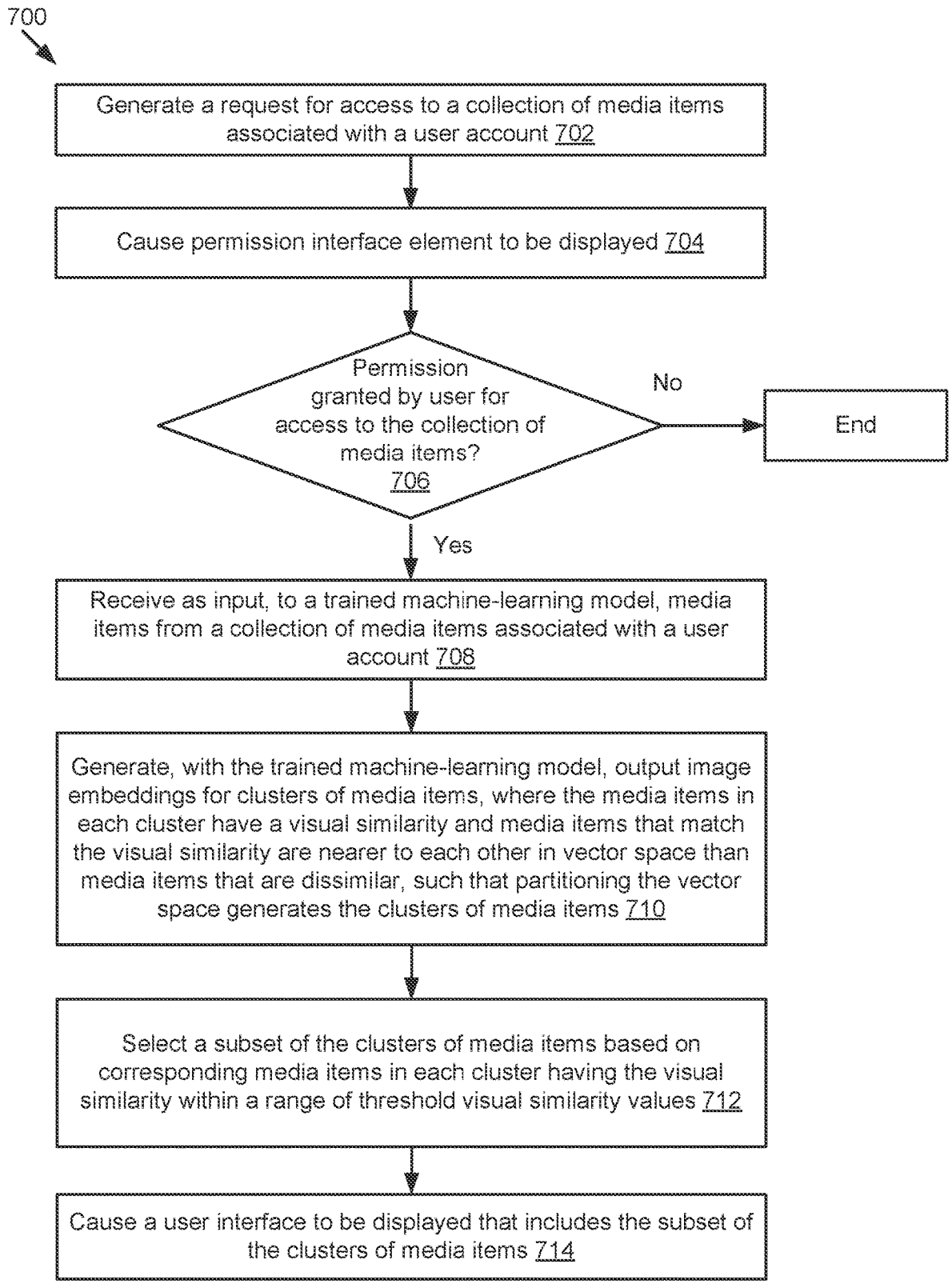
FIG. 7 is a flow diagram illustrating an example method for using a machine-learning model to generate embeddings for clusters of media items and selecting a subset of the clusters of media items, according to some embodiments described therein.

FIG. 7 is a flow diagram illustrating an example method 700 for using a machine-learning model to generate embeddings for clusters of media items and selecting a subset of the clusters of media items, according to some embodiments. The method illustrated in flowchart 700 may be performed by the computing device 200 in FIG. 2.

The method 700 may begin at block 702. In block 702, a request is generated for access to a collection of media items associated with a user account. In some embodiments, the request is generated by the user interface module 208. Block 702 may be followed by block 704.

At block 704, a permission interface element is caused to be displayed. For example, the user interface module 208 may display a user interface that includes a permission interface element requesting that the user provide permission to access the collection of media items. Block 704 may be followed by block 706.

At block 706, it is determined whether permission was granted by the user for access to the collection of media items. In some embodiments, block 706 is performed by the user interface module 208. If the user does not provide permission, the method ends. If the user does provide permission, block 706 may be followed by block 708.

At block 708, a trained machine-learning model receives as input media items from a collection of media items associated with a user account. In some embodiments, block 708 is performed by the machine-learning module 205. Block 708 may be followed by block 710.

In block 710, the trained machine-learning model generates output image embeddings for clusters of media items, where the media items in each cluster have a visual similarity and media items that match the visual similarity are nearer to each other in vector space than media items that are dissimilar, such that partitioning the vector space generates the clusters of media items. In some embodiments, block 710 is performed by the machine-learning module 205. Block 710 may be followed by block 712

In block 712, a subset of the clusters of media items is selected based on corresponding media items in each cluster having the visual similarity within a range of threshold visual similarity values. In some embodiments, block 712 is performed by the machine-learning module 205. Block 712 may be followed by block 714.

In block 714, a user interface is caused to be displayed that includes the subset of the clusters of media items. In some embodiments, block 714 is performed by the user interface module 208.

Further to the descriptions above, a user may be provided with controls allowing the user to make an election as to both if and when systems, programs, or features described herein may enable collection of user information (e.g., information about a user's media items such as photos or videos; a user's interaction with a media application that displays media items; a user's social network; social actions or activities; profession; a user's preferences such as viewing preferences for image-based creations, settings for hiding people or pets, user interface preferences, etc.; or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs. EPROMs. EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
   determining, based on pixels of images or videos from a collection of media items, image embeddings for clusters of media items such that the media items in each cluster have a visual similarity, wherein:
   each media item is associated with a location and an associated timestamp,
   media items captured within a predetermined time period are associated with an episode, and
   the collection of media items is associated with a user account;

selecting a subset of the clusters of media items based on:
  corresponding media items in each cluster having the visual similarity within a range of threshold visual similarity values; and
  corresponding associated timestamps such that the corresponding media items in the subset of the clusters of media items meet a temporal diversity criteria that excludes more than a first predetermined number of the corresponding media items from the episode;
responsive to a number of the corresponding media items in the subset of clusters including more than a second predetermined number of media items removing one or more of the corresponding media items based on location such that the subset of the clusters of media items meets a location diversity criteria;
causing a user interface to be displayed that includes the subset of the clusters of media items;
receiving aggregated feedback from users for aggregated subsets of clusters of media items;
providing the aggregated feedback to a machine-learning model, wherein parameters of the machine-learning model are updated based on the aggregated feedback; and
modifying the image embeddings for the clusters of media items using the parameters of the machine-learning model with the updated parameters.

2. The method of claim 1, further comprising, prior to selecting the subset of the clusters of media items, excluding from the collection of media items, media items that are associated with a category that is in a list of prohibited categories.

3. The method of claim 1, further comprising prior to determining the clusters of media items, excluding media items that correspond to a category that is in a list of prohibited categories.

4. The method of claim 1, wherein the clusters of media items are further determined based on the corresponding media items being associated with labels that have a semantic similarity.

5. The method of claim 1, further comprising:
  scoring each media item in the subset of the clusters of media items based on analyzing a likelihood that a user associated with the user account performs a positive action with reference to the media item; and
  selecting the media items in the subset of the clusters of media items based on a corresponding score meeting a threshold score.

6. The method of claim 5, further comprising:
  receiving feedback from the user about one or more of the media items in the subset of the clusters of media items; and
  modifying a corresponding score for the one or more media items in the subset of the clusters of media items based on the feedback.

7. The method of claim 6, wherein the feedback includes an explicit action as indicated by removal of the one or more media items in the subset of the clusters of media items from the user interface or an implicit action as indicated by one or more of viewing the corresponding media items in the subset of the clusters of media items or sharing the corresponding media items in the subset of the clusters of media items.

8. The method of claim 1, further comprising:
  causing the user interface to be updated based on modifying the image embeddings for the clusters of media items.

9. The method of claim 1, further comprising selecting a particular media item from each cluster in the subset of the clusters of media items as a cover photo for the each cluster in the subset of the clusters of media items based on the particular media item including a greatest number of objects corresponding to the visual similarity.

10. The method of claim 1, further comprising adding a title to each cluster in the subset of the clusters of media items based on a type of visual similarity and a commonly used phrase.

11. The method of claim 1, wherein the subset of the clusters of media items is displayed in the user interface at predetermined intervals.

12. The method of claim 1, further comprising providing a notification to a user associated with the user account that the subset of the clusters of media items is available, wherein the notification includes a corresponding title for each of the clusters in the subset of the clusters of media items.

13. The method of claim 1, wherein:
  the determining comprises generating a vector representation of each media item using a trained machine-learning model;
  a vector distance between vector representations of pairs of media items is indicative of the visual similarity of the media items;
  the vector representation is an image embedding generated by the trained machine-learning model; and
  the clusters are selected such that the vector distance between each pair of media items within the cluster is outside the range of threshold visual similarity values.

14. A computer-implemented method comprising:
receiving as input to a trained machine-learning model, media items from a collection of media items associated with a user account, wherein media items are each associated with an associated timestamp and the media items that are captured within a predetermined time period are associated with an episode;
generating, with the trained machine-learning model, output image embeddings for clusters of media items, wherein the media items in each cluster have a visual similarity and media items that have the visual similarity are nearer to each other in vector space than media items that are dissimilar, such that partitioning the vector space generates the clusters of media items and wherein each media item is associated with a location;
selecting a subset of the clusters of media items based on:
  corresponding media items in each cluster having a visual similarity within a range of threshold visual similarity values; and
  corresponding associated timestamps such that the corresponding media items in the subset of the clusters of media items meet a temporal diversity criteria that excludes more than a first predetermined number of the corresponding media items from the episode;
responsive to a number of the corresponding media items in the subset of clusters including more than a second predetermined number of media items, removing one or more of the corresponding media items based on location such that the subset of the clusters of media items meets a location diversity criteria;
causing a user interface to be displayed that includes the subset of the clusters of media items;
receiving aggregated feedback from users for aggregated subsets of clusters of media items;

providing the aggregated feedback to a machine-learning model, wherein parameters of the machine-learning model are updated based on the aggregated feedback; and modifying the image embeddings for the clusters of media items using the parameters of the machine-learning model with the updated parameters.

15. The method of claim 14, wherein functional images are removed from the collection of media items before the collection of media items is provided to the trained machine-learning model.

16. The method of claim 14, wherein the aggregated feedback from users includes a reaction to a set of media items or a modification of a title of the set of media items.

17. A system comprising:
a processor; and
a memory coupled to the processor, with instructions stored thereon that, when executed by the processor, cause the processor to perform operations comprising:
determining, based on pixels of images or videos from a collection of media items, image embeddings for clusters of media items such that the media items in each cluster have a visual similarity, wherein:
each media item is associated with a location and an associated timestamp,
media items captured within a predetermined time period are associated with an episode, and
the collection of media items is associated with a user account;
selecting a subset of the clusters of media items based on:
corresponding media items in each cluster having the visual similarity within a range of threshold visual similarity values; and
corresponding associated timestamps such that the corresponding media items in the subset of the clusters of media items meet a temporal diversity criteria that excludes more than a first predetermined number of the corresponding media items from the episode;
responsive to a number of the corresponding media items in the subset of clusters including more than a second predetermined number of media items, removing one or more of the corresponding media items based on location such that the subset of the clusters of media items meets a location diversity criteria;
causing a user interface to be displayed that includes the subset of the clusters of media items;
receiving aggregated feedback from users for aggregated subsets of clusters of media items;
providing the aggregated feedback to a machine-learning model, wherein parameters of the machine-learning model are updated based on the aggregated feedback; and
modifying the image embeddings for the clusters of media items using the parameters of the machine-learning model with the updated parameters.

18. The system of claim 17, wherein:
each media item has an associated timestamp;
the media items captured within a predetermined time period are associated with an episode; and
selecting the subset of the clusters of media items is based on corresponding associated timestamps such that the corresponding media items in the subset of the clusters of media items meet a second temporal diversity criteria that excludes more than a predetermined number of the corresponding media items from a particular episode.

19. The system of claim 17, wherein the operations further comprise:
prior to selecting the subset of the clusters of media items, excluding from the collection of media items, media items that are associated with a category that is in a list of prohibited categories.

20. The system of claim 17, wherein the clusters of media items are further determined based on the corresponding media items being associated with labels that have a semantic similarity.

* * * * *